(12) United States Patent
Pierre

(10) Patent No.: US 12,151,883 B2
(45) Date of Patent: *Nov. 26, 2024

(54) SELF-CONTAINED AND PORTABLE/MOBILE WASTE LIQUID COLLECTION AND STORAGE UNIT

(71) Applicant: Mark Antony Pierre, Granite Bay, CA (US)

(72) Inventor: Mark Antony Pierre, Granite Bay, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,829

(22) Filed: Aug. 16, 2023

(65) Prior Publication Data

US 2023/0391545 A1 Dec. 7, 2023

Related U.S. Application Data

(63) Continuation of application No. 17/099,383, filed on Nov. 16, 2020, now Pat. No. 11,731,831, which is a continuation-in-part of application No. 16/569,873, filed on Sep. 13, 2019, now Pat. No. 10,836,571, which is a continuation-in-part of application No. 15/894,232, filed on Feb. 12, 2018, now Pat. No. 10,414,582.

(60) Provisional application No. 62/516,287, filed on Jun. 7, 2017, provisional application No. 62/458,431, filed on Feb. 13, 2017.

(51) Int. Cl.
*B65F 1/00* (2006.01)
*B65F 1/14* (2006.01)
*B65F 1/16* (2006.01)

(52) U.S. Cl.
CPC ............ *B65F 1/006* (2013.01); *B65F 1/1473* (2013.01); *B65F 1/1607* (2013.01); *B65F 2210/132* (2013.01); *B65F 2240/112* (2013.01); *B65F 2250/1143* (2013.01)

(58) Field of Classification Search
CPC ...... B65F 1/006; B65F 1/1473; B65F 1/1607; B65F 2210/132; B65F 2240/112; B65F 2250/1143
USPC .............................. 4/619, 625, 630, 631, 650
See application file for complete search history.

(56) References Cited

U.S. PATENT DOCUMENTS

| | | | |
|---|---|---|---|
| 4,019,896 A | 4/1977 | Appleby | |
| 4,538,512 A | 9/1985 | Blough | |
| 4,887,837 A | 12/1989 | Bonewicz, Jr. | |
| 5,172,630 A | 12/1992 | Thompson | |
| 5,465,438 A | 11/1995 | Allman | |
| 5,687,434 A * | 11/1997 | Tagg | E03B 11/04 4/625 |
| 6,352,088 B1 * | 3/2002 | Stegall | B60R 15/00 4/323 |
| 6,443,057 B1 | 9/2002 | Gazzoli | |
| 7,441,286 B1 | 10/2008 | Taylor Parker | |

(Continued)

*Primary Examiner* — Tuan N Nguyen
(74) *Attorney, Agent, or Firm* — Inventive Law Inc.; Jim H. Salter

(57) ABSTRACT

A self-contained and portable/mobile waste liquid collection and storage unit is disclosed. An example embodiment includes: a waste liquid reservoir within the unit, the reservoir being defined by a void within the unit and interior wall surfaces of the unit; and an integrated sink with a drain, the sink being molded into a top surface of the unit and fabricated using a same type of material as the top surface of the unit, the drain including a coupling to transfer waste liquid from the sink to the waste liquid reservoir.

20 Claims, 19 Drawing Sheets

(56) References Cited

U.S. PATENT DOCUMENTS

| | | |
|---|---|---|
| 8,544,673 B1 | 10/2013 | Polk |
| 9,003,967 B2 | 4/2015 | Reed |
| 10,196,203 B2 | 2/2019 | Standke |
| 10,414,582 B2 | 9/2019 | Pierre |
| 10,836,571 B2 | 11/2020 | Pierre |
| 11,731,831 B2 * | 8/2023 | Pierre ................ B65F 1/0053 4/625 |
| 2006/0233470 A1 | 10/2006 | Jacoby |
| 2007/0114188 A1 | 5/2007 | Irvine |
| 2008/0246239 A1 | 10/2008 | Connor |
| 2011/0089179 A1 | 4/2011 | Flewelling |
| 2013/0042919 A1 | 2/2013 | Lambke |
| 2014/0262985 A1 | 9/2014 | Dorsett |
| 2014/0305883 A1 | 10/2014 | Julian |
| 2016/0137412 A1 | 5/2016 | Capetillo |
| 2017/0246976 A1 | 8/2017 | Lutzer |
| 2020/0002089 A1 | 1/2020 | Pierre |
| 2021/0078796 A1 | 3/2021 | Pierre |

* cited by examiner

```
                    ┌─────────────────────────────────────────┐
                    │   METHOD FOR PROVIDING A                │
                    │ TRASH RECEPTACLE FOR SEPARATING LIQUIDS │
                    │              AND SOLIDS                 │
                    │                 -1000-                  │
                    └─────────────────────────────────────────┘
                                        │
                                        ▼
```

Assemble a lid unit including a sink area for receiving waste liquids and a chute area for receiving waste solids.
-1010-

Assemble a reservoir tank for retaining the waste liquids, the sink area including a connecting tube coupling the sink area to the reservoir tank and enabling the waste liquids to flow from the sink area into the reservoir tank.
-1020-

Mount the assembled reservoir tank on an opening of a trash container.
-1030-

Mount the assembled lid unit on the reservoir tank.
-1040-

End

Fig. 15

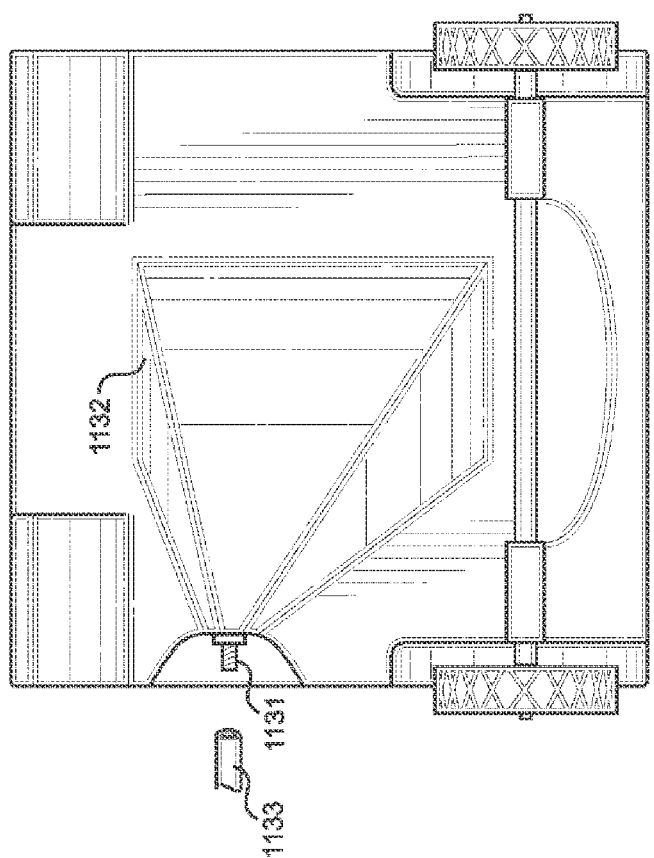

SELF-CONTAINED AND PORTABLE/MOBILE WASTE LIQUID COLLECTION AND STORAGE UNIT

PRIORITY PATENT APPLICATIONS

This is a non-provisional continuation patent application claiming priority to U.S. patent application, Ser. No. 17/099,383, filed Nov. 16, 2020; which is a non-provisional continuation-in-part patent application claiming priority to U.S. patent application, Ser. No. 16/569,873, filed Sep. 13, 2019; which is a non-provisional continuation-in-part patent application claiming priority to U.S. patent application, Ser. No. 15/894,232, filed Feb. 12, 2018; which is a non-provisional patent application claiming priority to U.S. provisional patent application, Ser. No. 62/458,431, filed Feb. 13, 2017; and to U.S. provisional patent application, Ser. No. 62/516,287, filed Jun. 7, 2017. This non-provisional patent application claims priority to the referenced patent applications. The entire disclosure of the referenced patent applications is considered part of the disclosure of the present application and is hereby incorporated by reference herein in its entirety.

TECHNICAL FIELD

The disclosed subject matter relates to the field of trash or garbage receptacles, and particularly although not exclusively, to a self-contained and portable/mobile waste liquid collection and storage unit.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2016-2023, Mark Antony Pierre; All Rights Reserved.

BACKGROUND

Discarding and hauling trash is an expensive, environmentally hazardous, and injury-producing activity. One significant problem with discarding trash is the presence of liquids contaminating solids and recyclables in trash. The liquids in the trash contribute to excess weight and volume of the trash, undesirable $CO_2$ gas production from landfills, and unhealthy conditions for sanitation and landfill workers. As a result, the presence of liquids in trash produces a variety of problems, hazards, and costs.

SUMMARY

A self-contained and portable/mobile waste liquid collection and storage unit is disclosed. An example embodiment includes: a self-contained and portable/mobile waste liquid collection and storage unit comprising: a waste liquid reservoir within the unit; an integrated sink with a drain; a P-trap coupled to the drain to transfer waste liquid from the sink to the waste liquid reservoir; wheels for mobility attached to a bottom of the unit; and a handle to facilitate portability of the unit.

BRIEF DESCRIPTION OF THE DRAWINGS

Embodiments are illustrated by way of example and not limitation in the figures of the accompanying drawings, in which:

FIG. 15 illustrates a flow diagram representing a sequence of operations performed in a method according to an example embodiment;

FIG. 22 illustrates a bottom view of an alternative example embodiment of the self-contained and portable/mobile waste liquid collection and storage unit.

DETAILED DESCRIPTION

Figure 1:
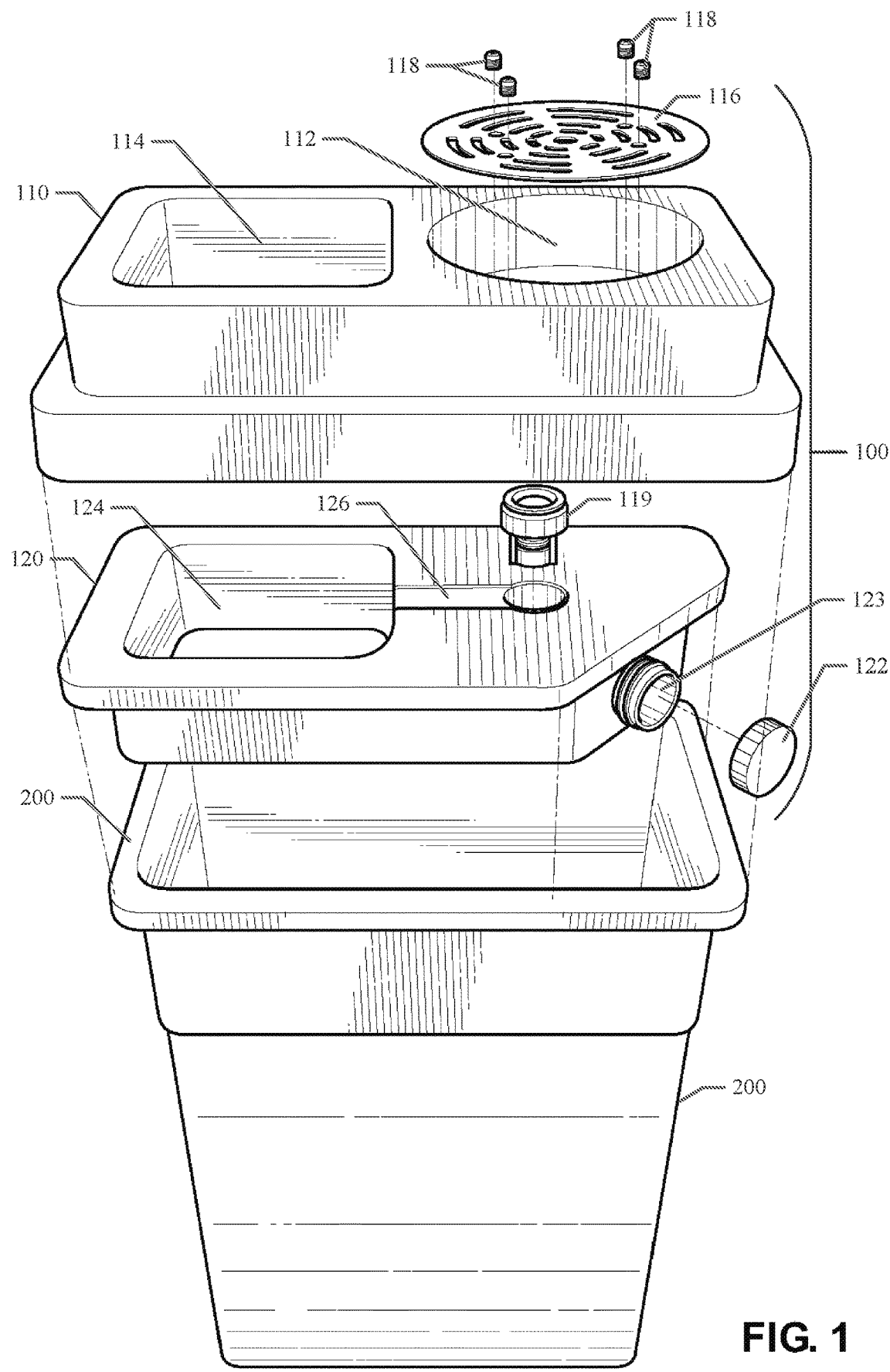
FIG. 1 illustrates a blown-up version of an example embodiment interacting with a trash container.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is disclosed, illustrated, and claimed a trash receptacle for separating liquids and solids. The example embodiments disclosed herein provide an apparatus, system, and method implemented as a trash receptacle for separating liquids and solids, which can be used in a variety of applications. The trash receptacle for separating liquids and solids of various example embodiments can be a two-piece recycling separation system designed with two orifices, which can be mounted on top of a trash container or other trash or garbage container. A trash orifice of the trash receptacle provides a pass through chute straight into the trash container. A liquid orifice of the trash receptacle provides a catch area for liquid waste. When liquid is poured in the liquid orifice, the liquid is funneled down a drain and stored in a reservoir tank for future disposal. Once the reservoir tank is full, the tank can be removed and the waste liquid can easily be discarded or recycled by removing a screw cap and pouring the liquid content into a sink/drain or proper recycling container. The solid trash placed in the trash orifice passes directly through the lid and reservoir tank of the trash receptacle. The solid trash is directed dry into the trash container. Once the trash container is full, an individual can lift off the lid and reservoir tank of the trash receptacle and remove the solid trash from the trash container.

In an example embodiment, the two-piece system comprises a fitted plastic lid unit 5.5"×20.25"×11.5" (H×W×D) and a plastic reservoir tank 4.5"×20"×11.25" (H×W×D). The lid unit is made with a 7.25"×8" pass through chute for solid trash and a round 7" sink area with a catch drain for waste liquids. The lid unit is designed to be mounted on top of the reservoir tank when the trash receptacle is assembled. When the lid unit is mounted on top of the reservoir tank, the drain tube of the lid unit depresses the top of a plastic spring loaded check valve. When the trash receptacle is assembled, liquid poured in the sink area of the lid unit flows freely into the reservoir tank. Once the reservoir tank is full, the lid unit can be removed, thereby causing the check valve to close and providing a liquid tight reservoir tank. The reservoir tank is then ready to be transported and content disposed of using a proper recycling method. The assembled trash receptacle can be mounted on an opening of any 23-gallon rectangular trash container. The disclosed embodiments can be universal, fitting many different configurations and shapes of trash containers with slight variations of measurements.

Referring now to FIGS. 1 through 9, example embodiments of the trash receptacle 100 for separating liquids and solids are illustrated. FIG. 1 illustrates a blown-up version of an example embodiment interacting with a trash container 200. Referring now to FIG. 1, the trash receptacle 100 includes a lid unit 110 and a reservoir tank 120. The lid unit 110 includes a sink area 112 for receiving waste liquids and a chute area 114 for receiving waste solids. The sink area 112 and the chute area 114 can be fabricated as a single integrated component. The sink area 112 includes a stainless-steel grate 116 to strain off any large items that may be placed in the sink area 112. Stainless steel screws 118 can be used to hold the stainless-steel grate 116 in place in the sink area 112. The lid unit 110 includes the sink area 112 for receiving liquids and the chute area 114 for receiving solids, which pass through a corresponding chute 124 of the reservoir tank 120 and straight into the trash container 200. The stainless steel screws 118 can be configured so that the stainless-steel grate 116 can be attached in place in the sink area 112 and detached for cleaning purposes.

In the example embodiment shown in FIG. 1, the sink area 112 also includes a drain with a connecting tube 119 at the base of the sink area 112. The drain and connecting tube 119 can be configured with a check valve, which is depressed and opened when the lid unit 110 is attached to the reservoir tank 120. The drain with the connecting tube 119 and the open check valve enable liquid to flow from the sink area 112 into the reservoir tank 120 via the drain with the connecting tube 119 when the lid unit 110 is attached to the reservoir tank 120. The check valve can be configured to close and prevent the leakage of liquid when the lid unit 110 is detached from the reservoir tank 120. In an example embodiment, the check valve can be a plastic spring-loaded check valve, which permits liquids to enter the reservoir tank 120 from the lid unit 110 when the lid unit 110 is attached to the reservoir tank 120. When the lid unit 110 is removed or detached from the reservoir tank 120 and the trash receptacle 100 is disassembled, the check valve reverts to the closed position preventing the leakage of liquids from the reservoir tank 120. When the lid unit 110 is placed on the reservoir tank 120 and the trash receptacle 100 is assembled, the check valve is depressed into the open position and liquid from the sink area 112 can flow into the reservoir tank 120 via the drain with the connecting tube 119. In an example embodiment, the reservoir tank 120 can be a 1.7-gallon reservoir tank. The reservoir tank 120 can be configured to include a threaded cap 122, which seals a threaded exit port 123 of the reservoir tank 120. The exit port 123 can be used to empty the liquid contents of the reservoir tank 120. The reservoir tank 120 can also be configured to include a drain channel 126 extending from the drain with the connecting tube 119 to the chute 124. The drain channel 126 provides a depression or groove to direct any excess liquid from the drain with the connecting tube 119 to the chute 124.

In the example embodiment, the trash container 200 can be a 23-gallon trash container with a generally rectangular opening at the top. The trash receptacle 100 of one example embodiment can be configured in a generally rectangular shape to fit over the generally rectangular opening at the top of the trash container 200. As described in more detail below, the trash receptacle 100 of various other example embodiments can be configured in other shapes (e.g., circular or oval) to fit over the openings of trash containers of varying other shapes.

Figure 2:
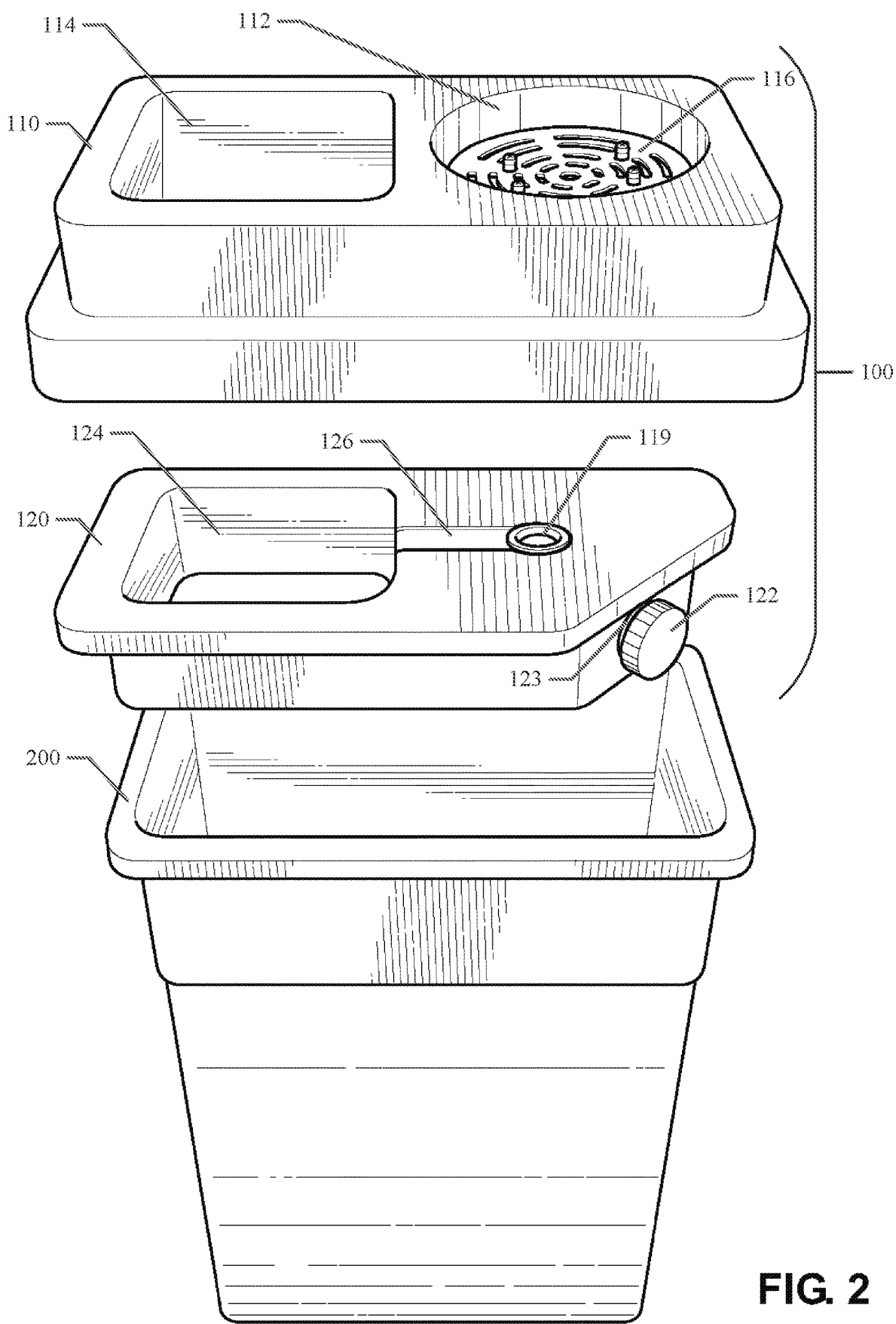
FIG. 2 illustrates a blown-up version of an example embodiment interacting with a trash container, wherein a stainless-steel grate is mounted into a sink area and a threaded cap is attached on a threaded drain spout.

FIG. 2 illustrates a blown-up version of an example embodiment interacting with a trash container 200, wherein the stainless-steel grate 116 is mounted into the sink area 112 and the threaded cap 122 is screwed on the threaded drain spout 123. As shown in FIG. 2, the lid unit 110 is fully assembled and ready to be placed on the fully assembled reservoir tank 120. The fully assembled lid unit 110 can be placed on the fully assembled reservoir tank 120, causing the check valve in the drain with the connecting tube 119 to open and enable fluid flow from the sink area 112 to the reservoir tank 120. The assembled trash receptacle 100 of the example embodiment can then be placed on the opening of the trash container 200. As a result, the trash container 200 with the installed trash receptacle 100 provides a trash receptacle for separating liquids and solids.

Figure 3:
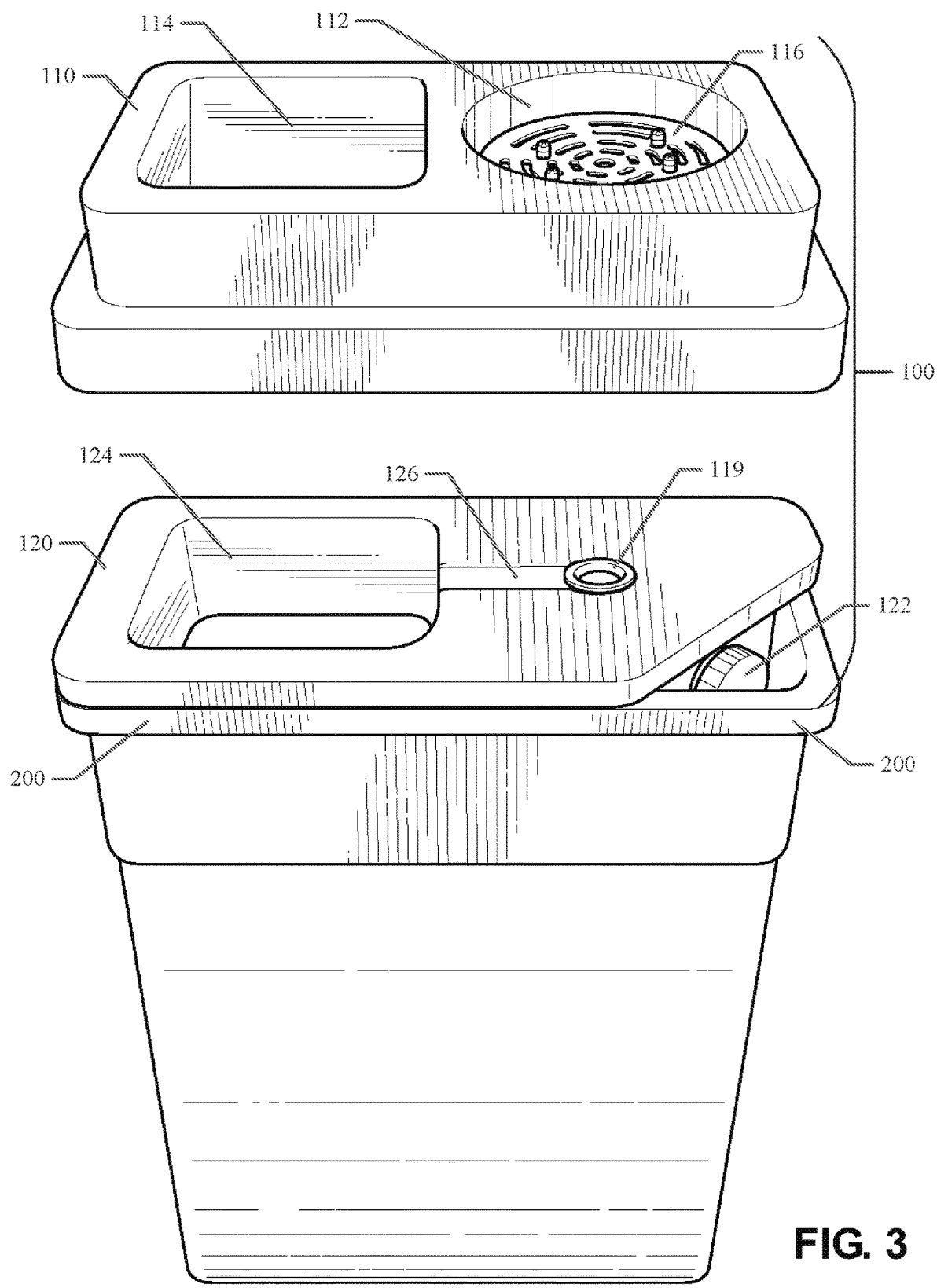
FIG. 3 illustrates a blown-up version of an example embodiment interacting with a trash container, wherein the reservoir tank assembly is inserted into an opening of the trash container.

FIG. 3 illustrates a blown-up version of an example embodiment interacting with a trash container 200, wherein the fully assembled reservoir tank 120 is inserted into the opening of the trash container 200. As shown in FIG. 3, the lid unit 110 is fully assembled and ready to be placed on the fully assembled reservoir tank 120. The fully assembled reservoir tank 120 can be placed on the opening of the trash container 200. Then, the fully assembled lid unit 110 can be placed on the fully assembled reservoir tank 120, causing the check valve in the drain with the connecting tube 119 to open and enable fluid flow from the sink area 112 to the reservoir tank 120. The assembled trash receptacle 100 of the example embodiment can remain mounted on the opening of the trash container 200 while in use. As a result, the trash container 200 with the installed trash receptacle 100 provides a trash receptacle for separating liquids and solids.

Figure 4:
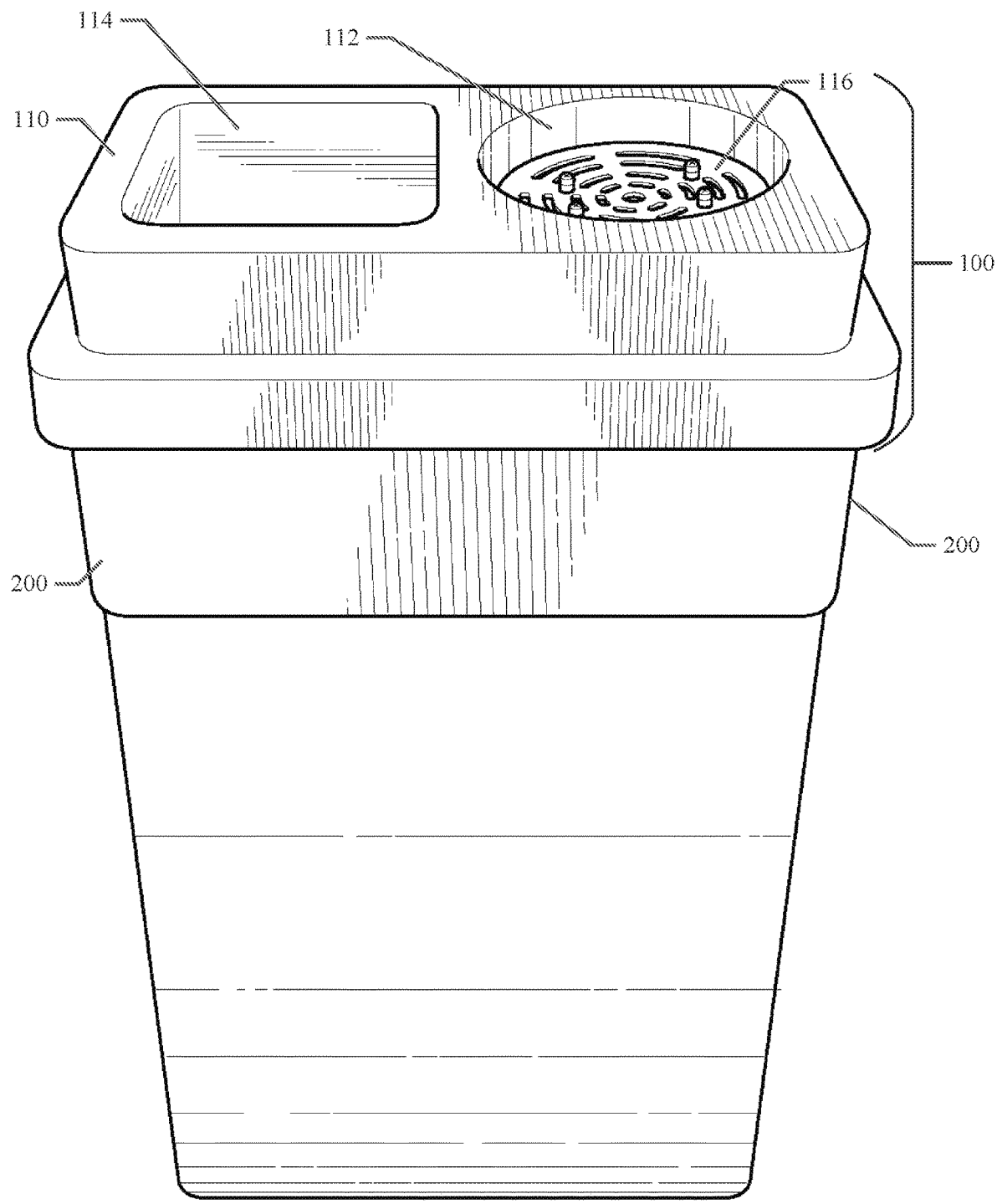
FIG. 4 illustrates an example embodiment, wherein the assembled lid and reservoir tank assembly are mounted and inserted into an opening of the trash container.

FIG. 4 illustrates an example embodiment, wherein the fully assembled lid unit 110 and the fully assembled reservoir tank 120 are mounted into the open top of the trash container 200. As described above, the placement of the fully assembled lid unit 110 on the fully assembled reservoir tank 120 causes the check valve in the drain with the connecting tube 119 to open and enable fluid flow from the sink area 112 to the reservoir tank 120. Additionally, the chute area 114 is configured for receiving solid (non-liquid) material, which passes through the corresponding chute 124 of the reservoir tank 120 and straight into the trash container 200. The assembled trash receptacle 100 of the example embodiment can remain mounted on the opening of the trash container 200 while in use. As a result, the trash container 200 with the installed trash receptacle 100 provides a trash receptacle for separating liquids and solids.

Figure 5:
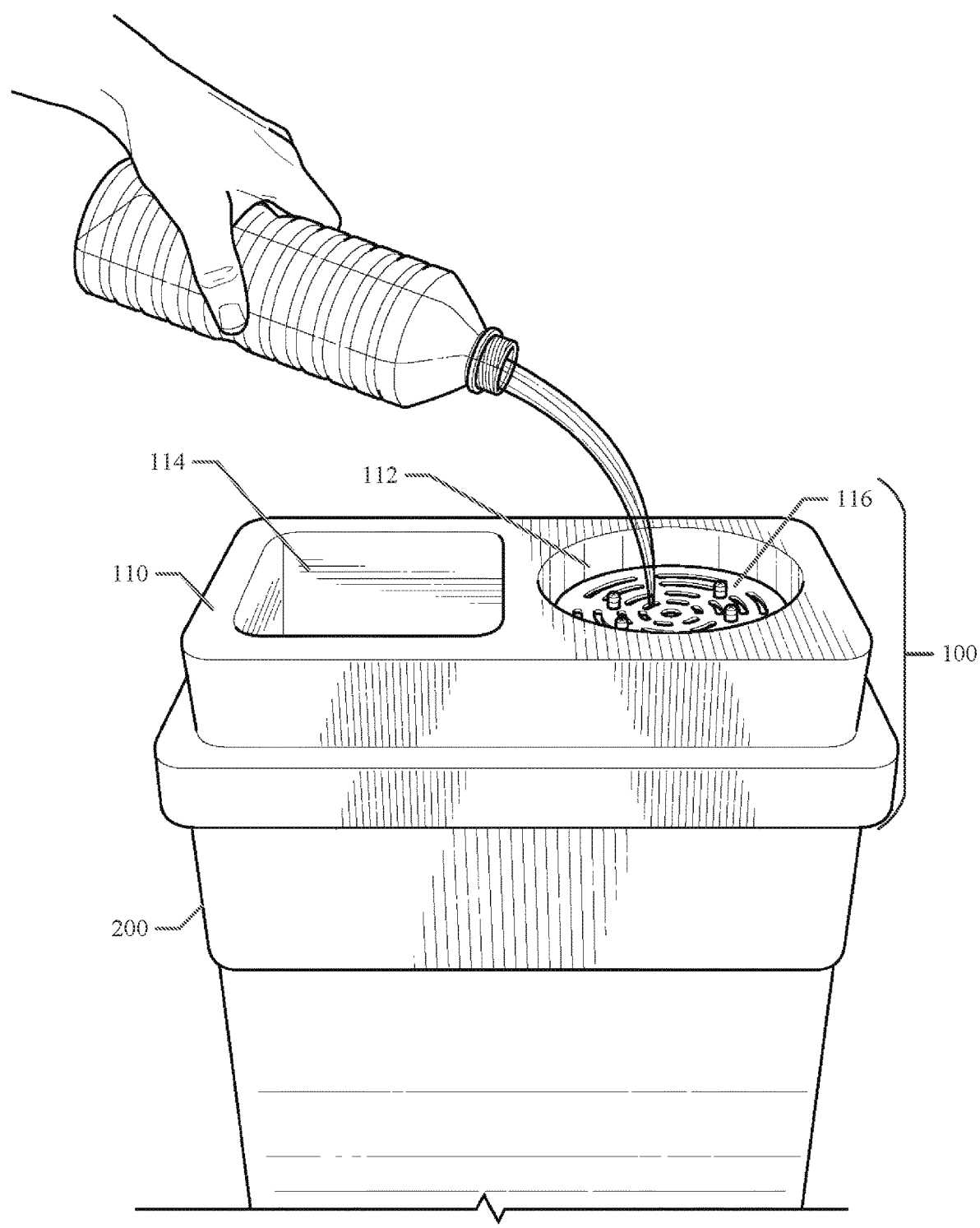
FIG. 5 illustrates an example usage of the trash receptacle for separating liquids and solids, wherein liquids are poured into the sink area and transported into the reservoir tank.

FIG. 5 illustrates an example usage of the trash receptacle 100 for separating liquids and solids, wherein liquids are poured into the sink area 112 and transported into the reservoir tank 120 as described above. The check valve in the drain with the connecting tube 119 is open and enables fluid flow from the sink area 112 to the reservoir tank 120 via the drain with the connecting tube 119. The waste liquids can be stored in the reservoir tank 120 for later disposal.

Figure 6:
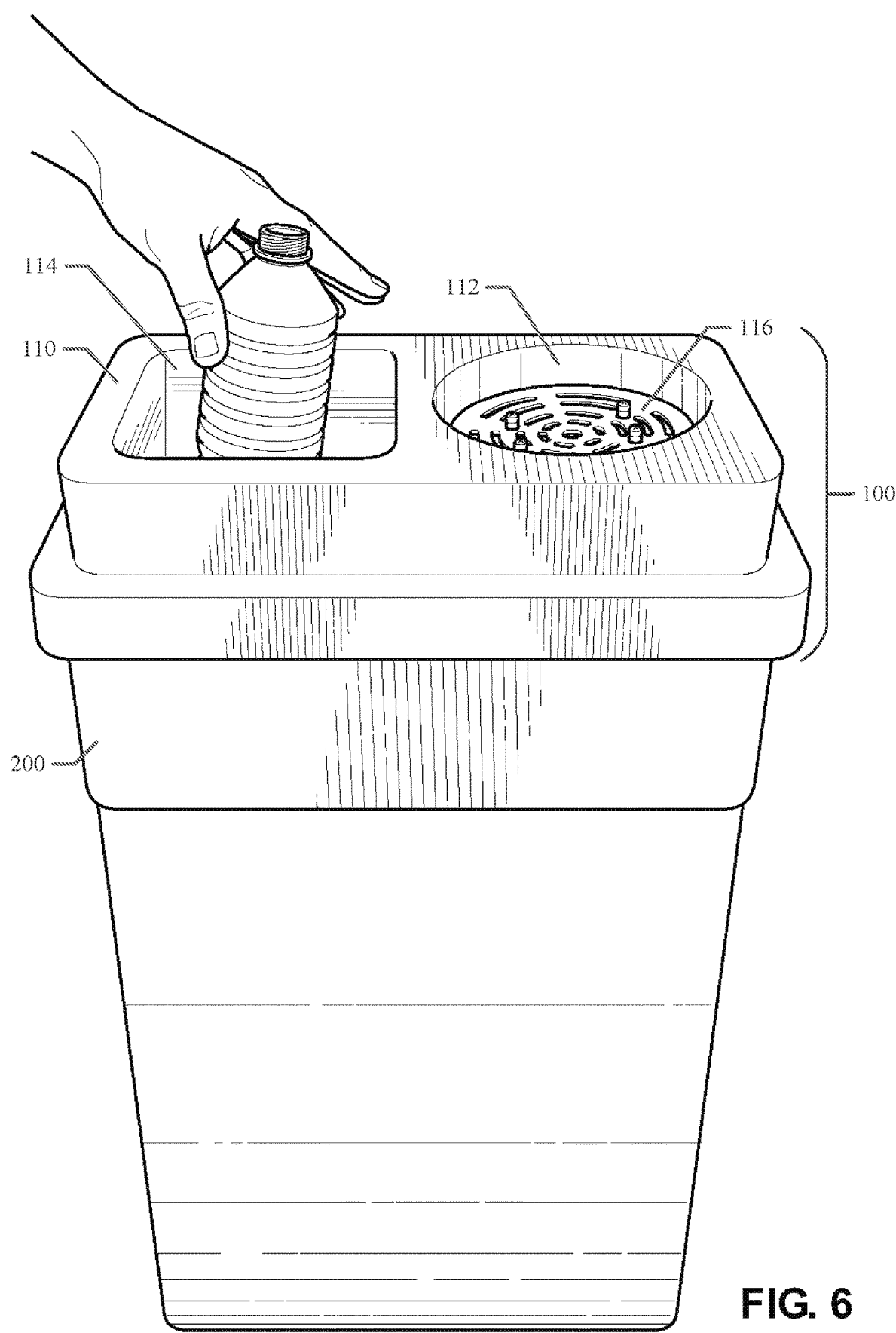
FIG. 6 illustrates an example usage of the trash receptacle for separating liquids and solids, wherein solid waste is discarded through the trash chute and passed into the trash container.

FIG. 6 illustrates an example usage of the trash receptacle 100 for separating liquids and solids, wherein solid waste is discarded through the chute area 114 and passed into the trash container 200. As shown, the solid waste can be discarded through the chute area 114, which passes through a corresponding chute 124 of the reservoir tank 120 and straight into the trash container 200. As a result, the trash receptacle 100 enables solid waste to be passed through the trash receptacle 100 and into the trash container 200.

Figure 7:
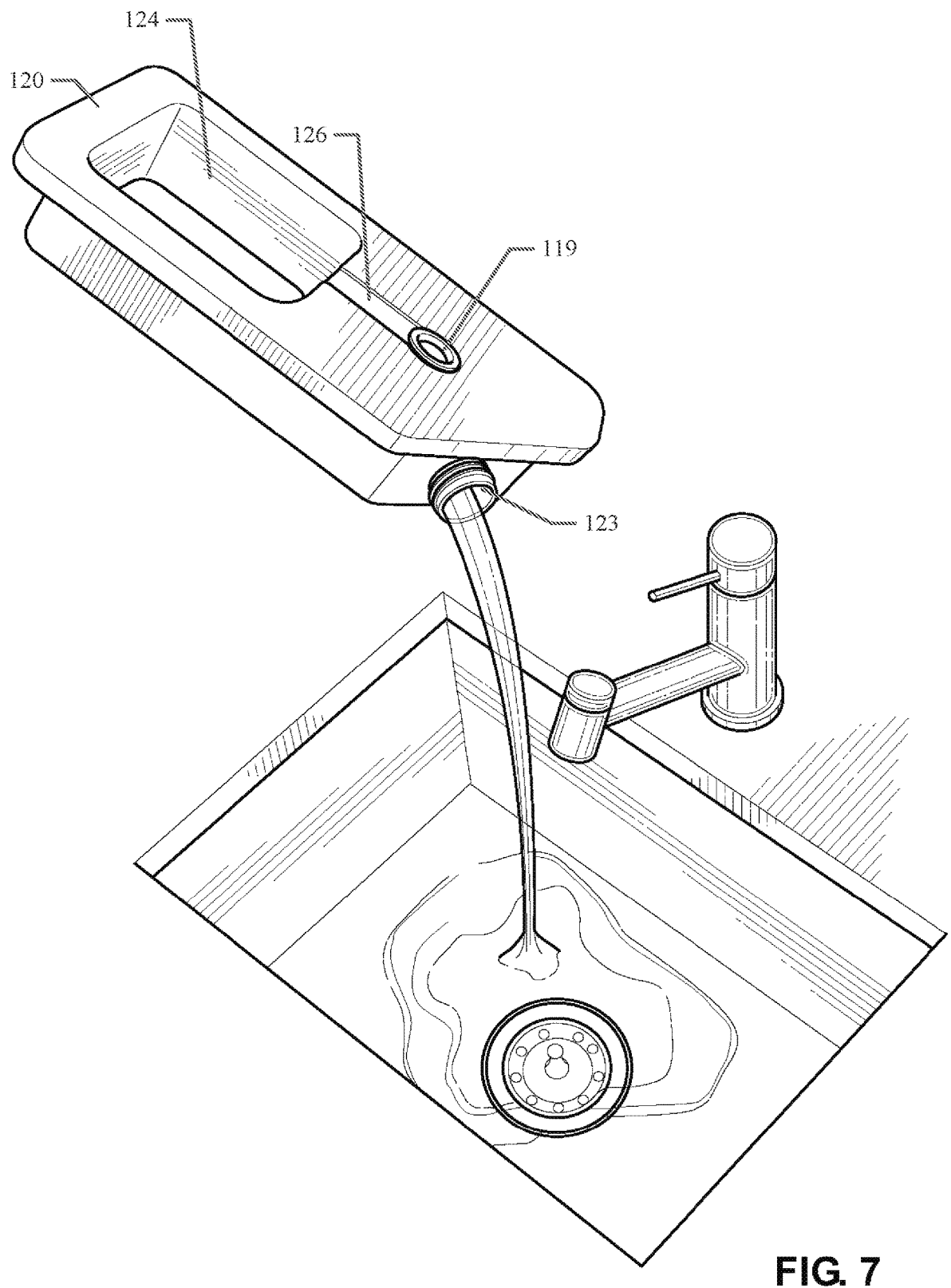
FIG. 7 illustrates an example embodiment, wherein the reservoir tank cap is removed and waste liquid is discarded into a sink.

FIG. 7 illustrates an example embodiment, wherein the waste liquid can be emptied from the reservoir tank 120. Referring now to FIG. 7, the reservoir tank 120 is shown detached or disassembled from the lid unit 110. As described above, when the reservoir tank 120 is detached from the lid unit 110, the check valve in the drain with the connecting tube 119 is configured to close and prevent leakage of liquid from the reservoir tank 120. When the lid unit 110 is removed from the reservoir tank 120 and the trash receptacle 100 is disassembled, the threaded cap 122 of the reservoir tank 120 can be removed to enable the waste liquid to be discarded via the threaded exit port 123 of the reservoir tank 120. In this manner, the reservoir tank 120 can be periodically emptied.

Figure 8:
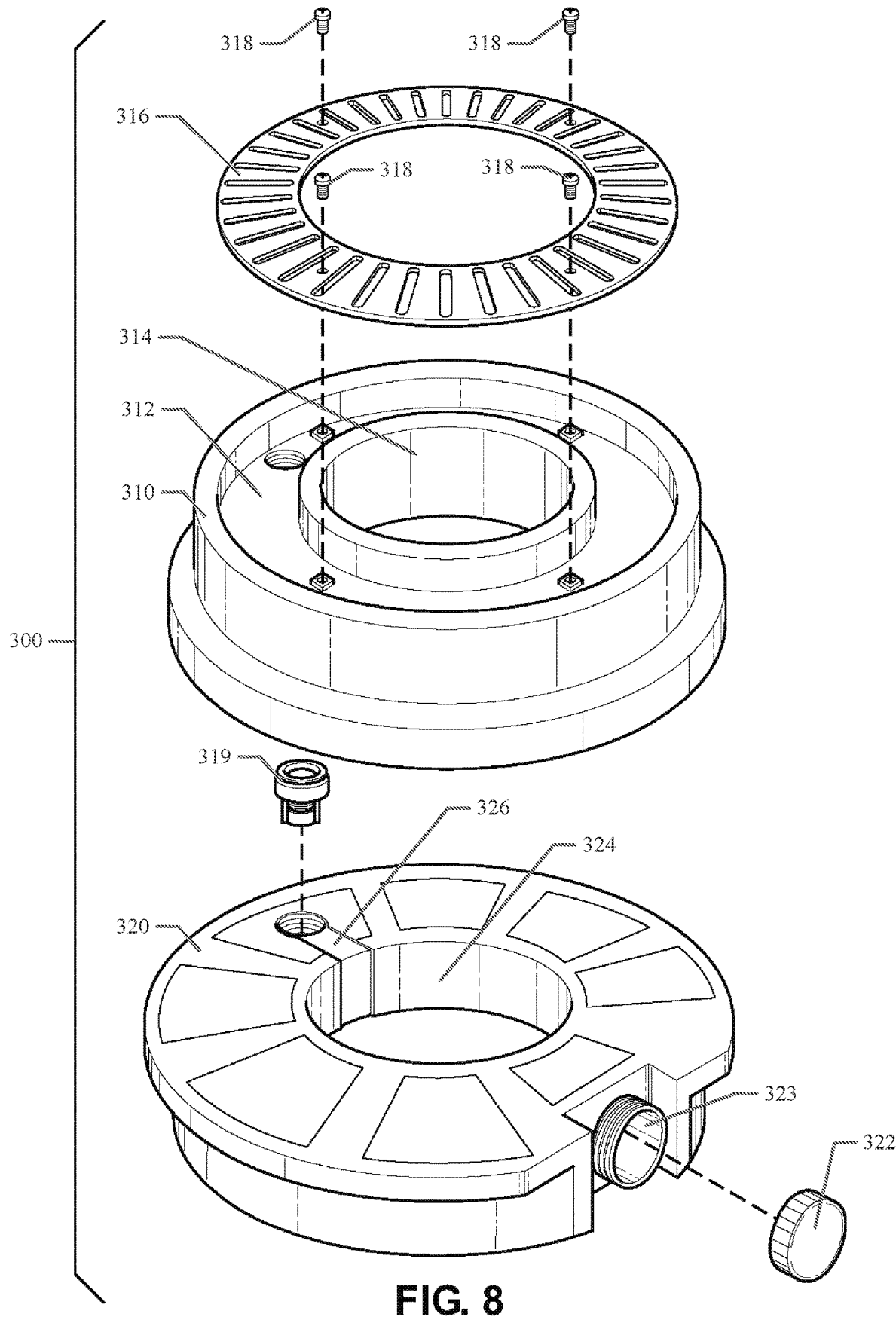
FIG. 8 illustrates a blown-up disassembled version of an alternative example embodiment for use with a round trash container.

FIG. 8 illustrates a blown-up disassembled version of an alternative example embodiment for use with a round trash container. Referring now to FIG. 8, the trash receptacle 300 includes a round lid unit 310 and a round reservoir tank 320. The lid unit 310 includes a sink area 312 for receiving waste liquids and a chute area 314 for receiving waste solids. The sink area 312 includes a stainless-steel grate 316 to strain off any large items that may be placed in the sink area 312. Stainless steel screws 318 can be used to hold the stainless-steel grate 316 in place in the sink area 312. The lid unit 310 includes the sink area 312 for receiving liquids and the chute area 314 for receiving solids, which pass through a corresponding chute 324 of the reservoir tank 320 and straight into the trash container 400. The stainless steel screws 318 can be configured so that the stainless-steel grate 316 can be attached in place in the sink area 312 and detached for cleaning purposes.

In the example embodiment shown in FIG. 8, the sink area 312 also includes a drain with a connecting tube 319 at the base of the sink area 312. The drain and connecting tube 319 can be configured with a check valve, which is depressed and opened when the lid unit 310 is attached to the reservoir tank 320. The drain with the connecting tube 319 and the open check valve enable liquid to flow from the sink area 312 into the reservoir tank 320 via the drain with the connecting tube 319 when the lid unit 310 is attached to the reservoir tank 320. The check valve can be configured to close and prevent the leakage of liquid when the lid unit 310 is detached from the reservoir tank 320. In an example embodiment, the check valve can be a plastic spring-loaded check valve, which permits liquids to enter the reservoir tank 320 from the lid unit 310 when the lid unit 310 is attached to the reservoir tank 320. When the lid unit 310 is removed from the reservoir tank 320 and the trash receptacle 300 is disassembled, the check valve reverts to the closed position preventing the leakage of liquids from the reservoir tank 320. When the lid unit 310 is placed on the reservoir tank 320 and the trash receptacle 300 is assembled, the check valve is depressed into the open position and liquid from the sink area 312 can flow into the reservoir tank 320 via the drain with the connecting tube 319. In an example embodiment, the reservoir tank 320 can be a two gallon reservoir tank. The reservoir tank 320 can be configured to include a threaded cap 322, which seals a threaded exit port 323 of the reservoir tank 320. The exit port 323 can be used to empty the liquid contents of the reservoir tank 320. The reservoir tank 320 can also be configured to include a drain channel 326 extending from the drain with the connecting tube 319 to the chute 324. The drain channel 326 provides a depression or groove to direct any excess liquid from the drain with the connecting tube 319 to the chute 324.

Figure 9:
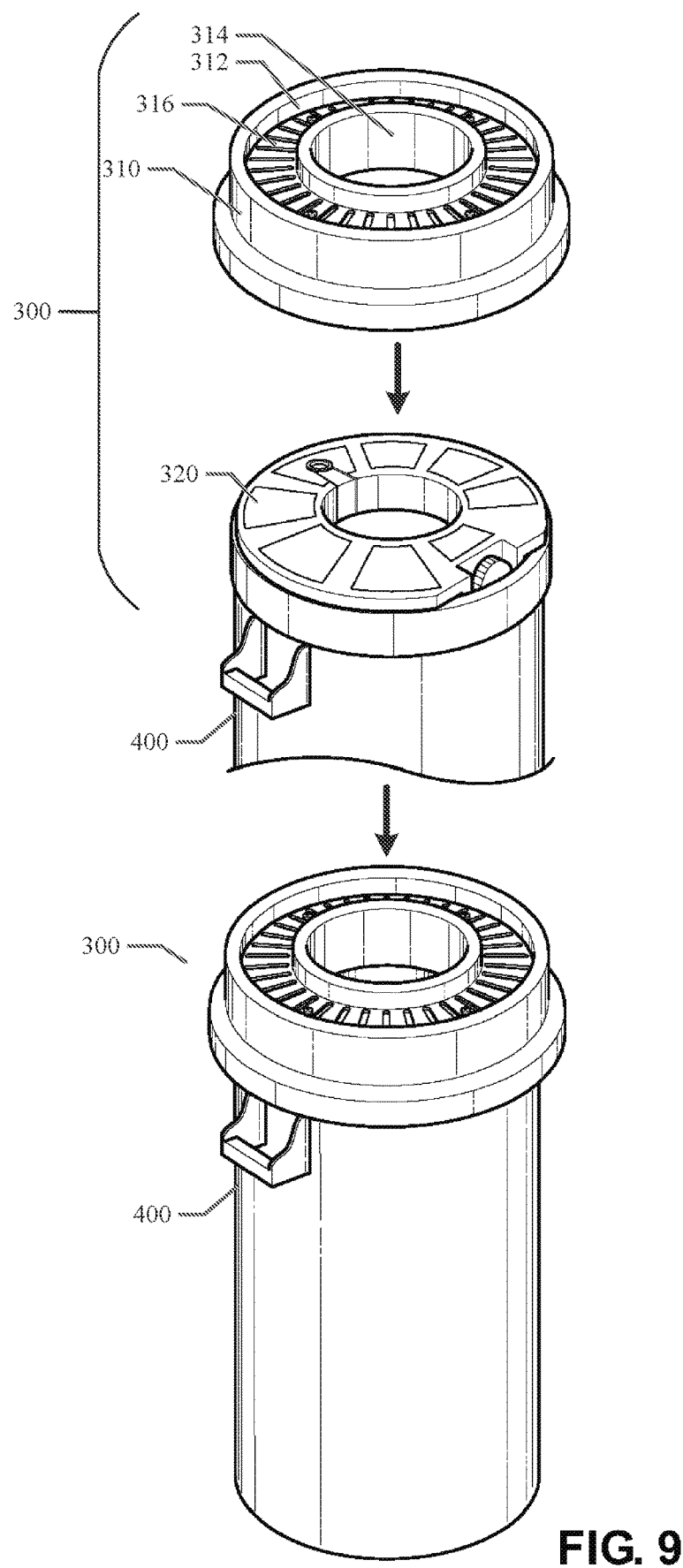
FIG. 9 illustrates a blown-up assembled version of an alternative example embodiment for use with a round trash container.

FIG. 9 illustrates a blown-up assembled version of the alternative example embodiment for use with a round trash container 400. Referring now to FIG. 9, the trash container 400 can be a 44-gallon trash container with a generally round opening at the top. The trash receptacle 300 of one example embodiment can be configured in a generally round shape to fit over the generally round opening at the top of the trash container 400. As described in more detail herein, the trash receptacle 300 of various other example embodiments can be configured in other shapes to fit over the openings of trash containers of varying other shapes.

Figure 10:
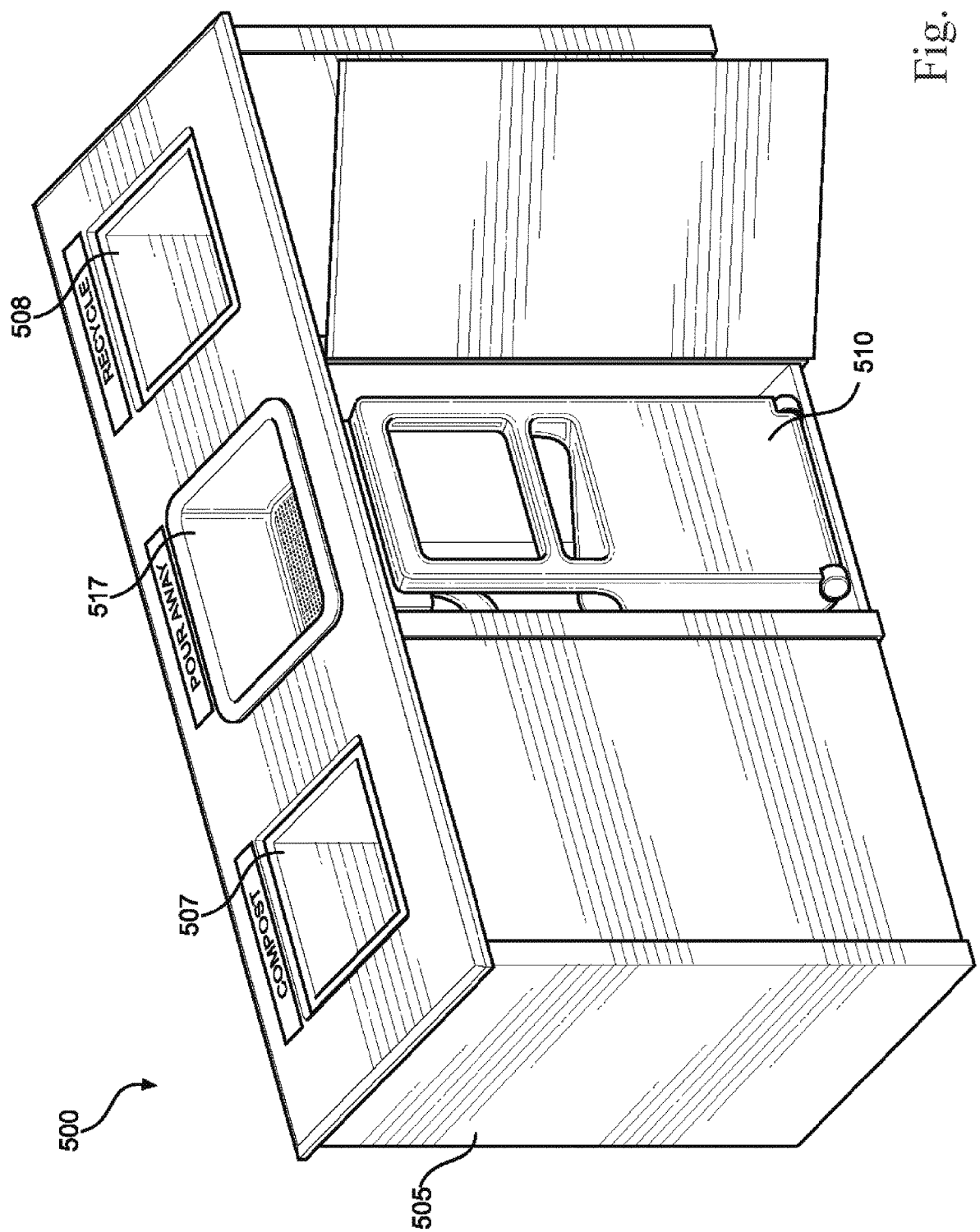
FIG. 10 illustrates an assembled version of an alternative example embodiment integrated in a cabinet with a removable and portable reservoir tank inserted into the cabinet.

FIG. 10 illustrates an assembled version of an alternative example embodiment 500 integrated in a cabinet 505 with a removable and portable reservoir tank 510 inserted into the cabinet 505. The cabinet 505 can include a compost waste receptacle 507 and a recycle waste receptacle 508 for solid waste disposal. The cabinet 505 can also include a sink area 517 for liquid disposal.

Figure 11:
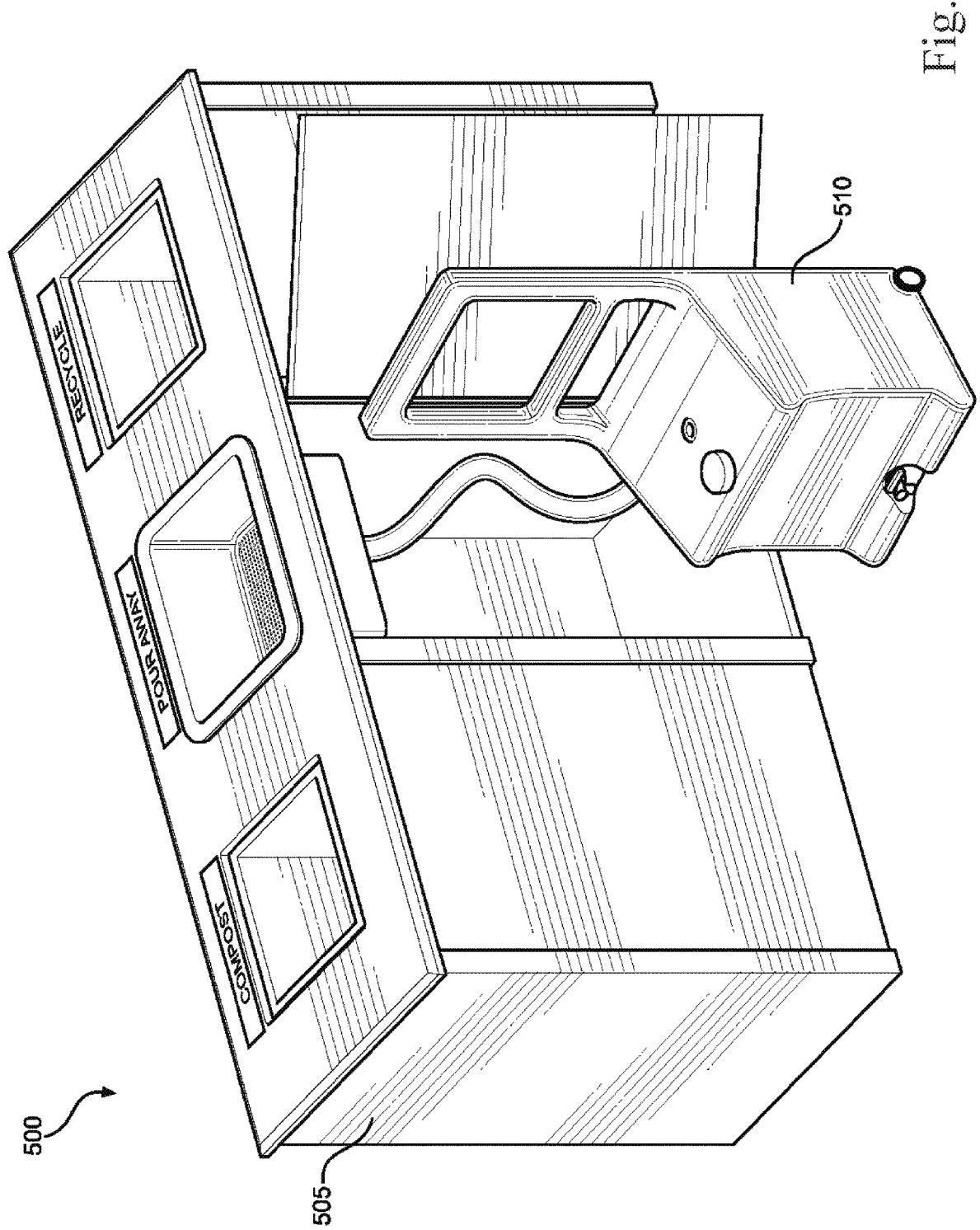
FIG. 11 illustrates an alternative example embodiment integrated in a cabinet with the removable and portable reservoir tank removed from the cabinet.

FIG. 11 illustrates the alternative example embodiment 500 integrated in a cabinet 505 with the removable and portable reservoir tank 510 removed from the cabinet 505.

Figure 12:
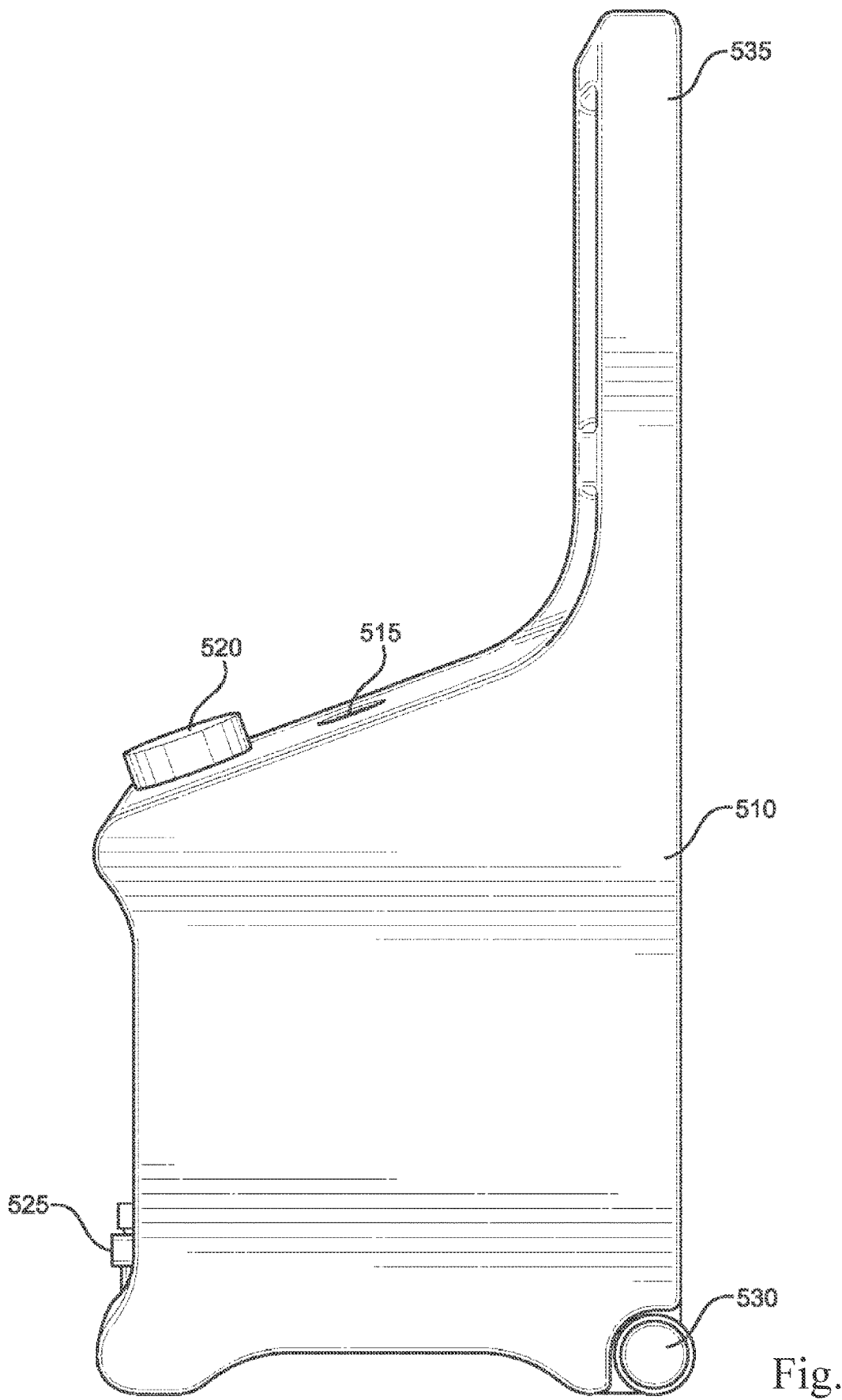
FIG. 12 illustrates a side view of the removable and portable reservoir tank of an alternative example embodiment.

FIG. 12 illustrates a side view of the removable and portable reservoir tank 510 of an alternative example embodiment. The reservoir tank 510 includes a connecting tube valve 515 to connect the reservoir tank 510 to the sink area 517 of the cabinet 505, an exit port 520 used to empty the liquid contents of the reservoir tank 510, and a drain valve 525 also used to empty the liquid contents of the reservoir tank 510. In the example embodiment, the reservoir tank 510 can also include wheels 530 and a handle 535 for portability and mobility.

Figure 13:
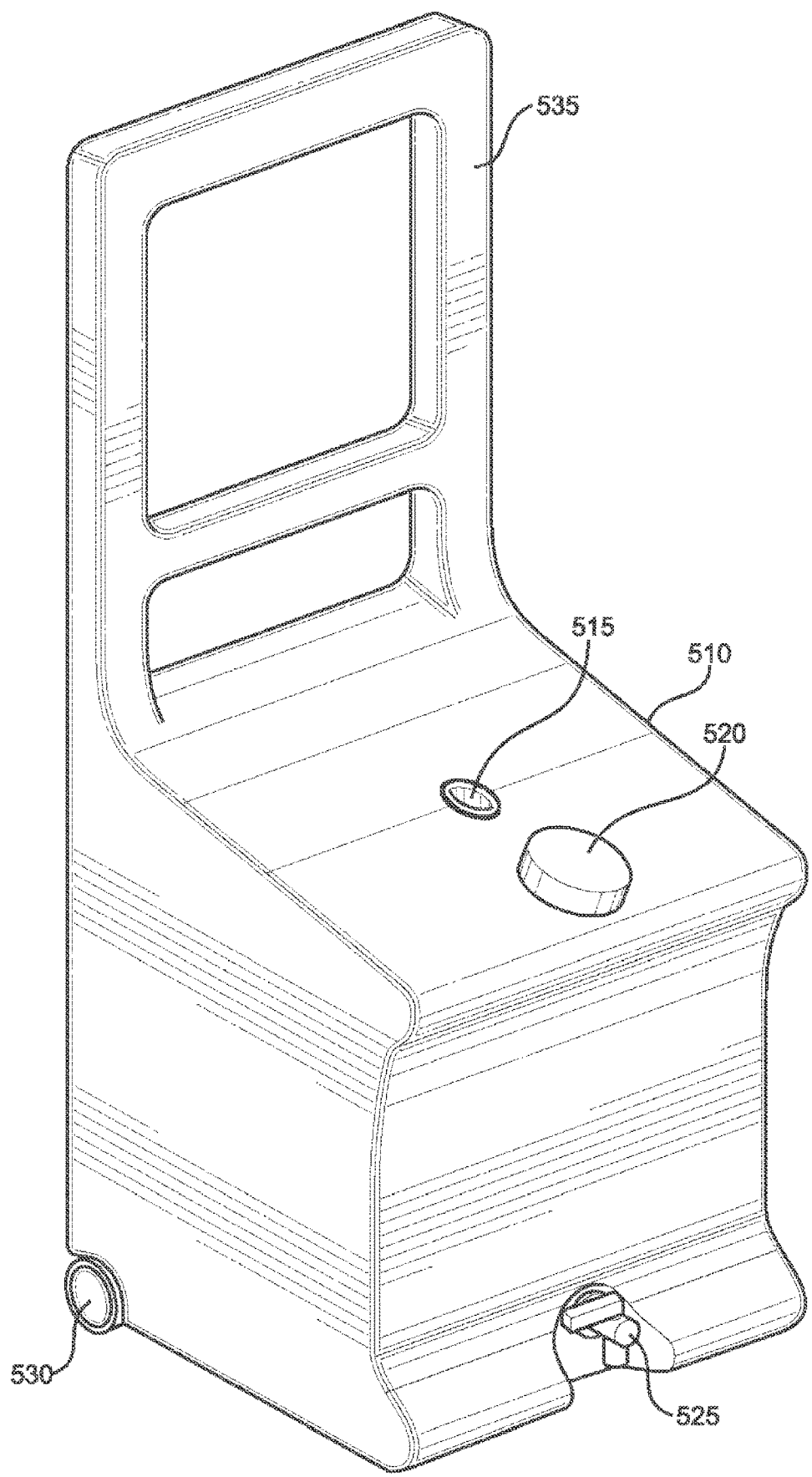
FIG. 13 illustrates a front perspective view of the removable and portable reservoir tank of an alternative example embodiment.

FIG. 13 illustrates a front perspective view of the removable and portable reservoir tank of an alternative example embodiment. The reservoir tank 510 includes a connecting tube valve 515 to connect the reservoir tank 510 to a sink area 517 of the cabinet 505, an exit port 520 used to empty the liquid contents of the reservoir tank 510, and a drain valve 525 also used to empty the liquid contents of the reservoir tank 510. In the example embodiment, the reservoir tank 510 can also include wheels 530 and a handle 535 for portability and mobility.

Figure 14:
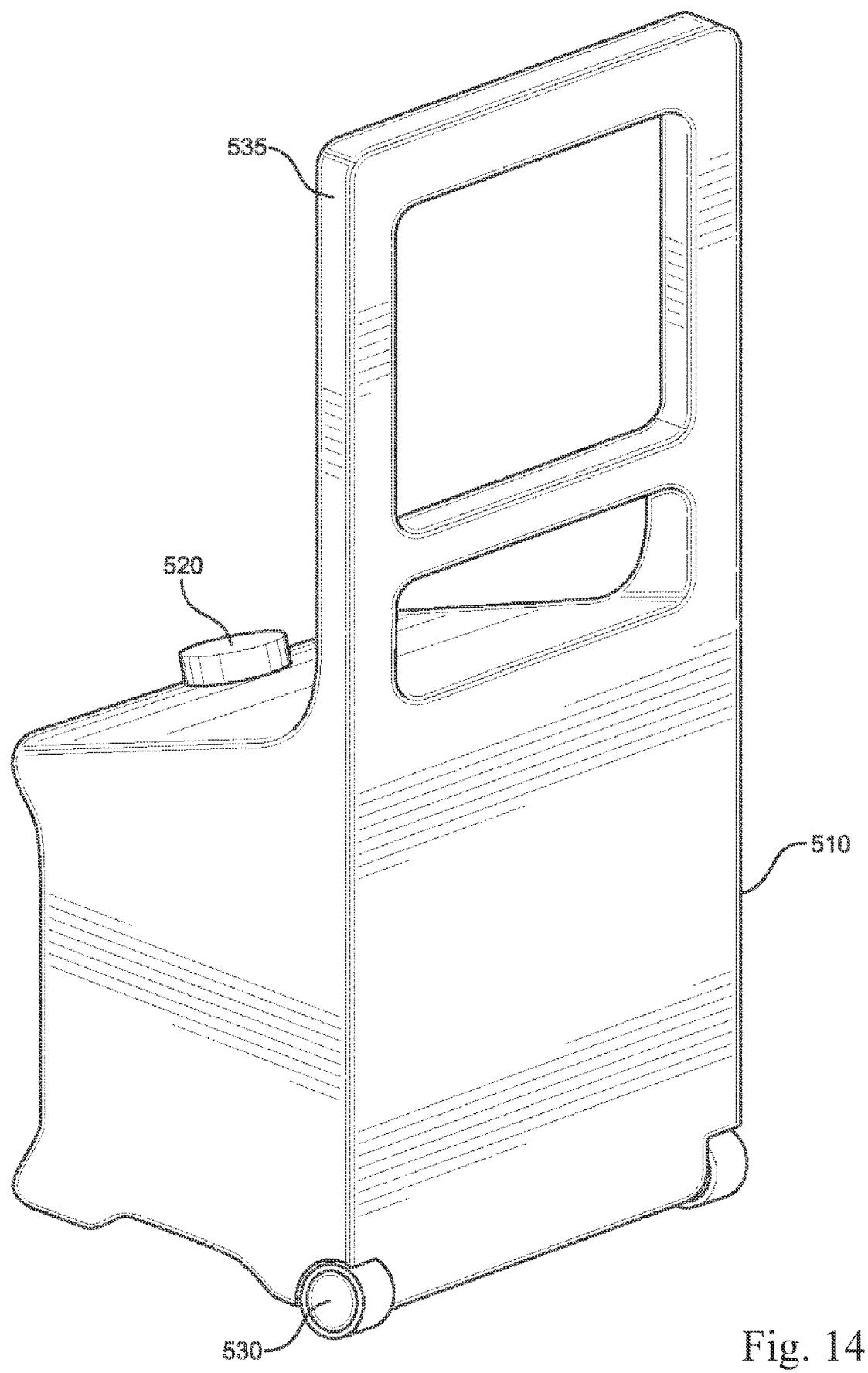
FIG. 14 illustrates a rear perspective view of the removable and portable reservoir tank of an alternative example embodiment.

FIG. 14 illustrates a rear perspective view of the removable and portable reservoir tank of an alternative example embodiment. The reservoir tank 510 includes a connecting tube valve 515 (not shown) to connect the reservoir tank 510 to a sink area 517 of the cabinet 505, an exit port 520 used to empty the liquid contents of the reservoir tank 510, and a drain valve 525 (not shown) also used to empty the liquid contents of the reservoir tank 510. In the example embodiment, the reservoir tank 510 can also include wheels 530 and a handle 535 for portability and mobility. In each of these alternative embodiments, the removable and portable reservoir tank 510 can be fabricated from a plastic material.

FIG. 15 illustrates a flow diagram representing a sequence of operations performed in a method according to an example embodiment. In accordance with the example method 1000, the method comprises: assembling a lid unit including a sink area for receiving waste liquids and a chute area for receiving waste solids (operation 1010); assembling a reservoir tank for retaining the waste liquids, the sink area including a connecting tube coupling the sink area to the reservoir tank and enabling the waste liquids to flow from the sink area into the reservoir tank (operation 1020); mounting the assembled reservoir tank on an opening of a trash container (operation 1030); and mounting the assembled lid unit on the reservoir tank (operation 1040).

Figure 17:
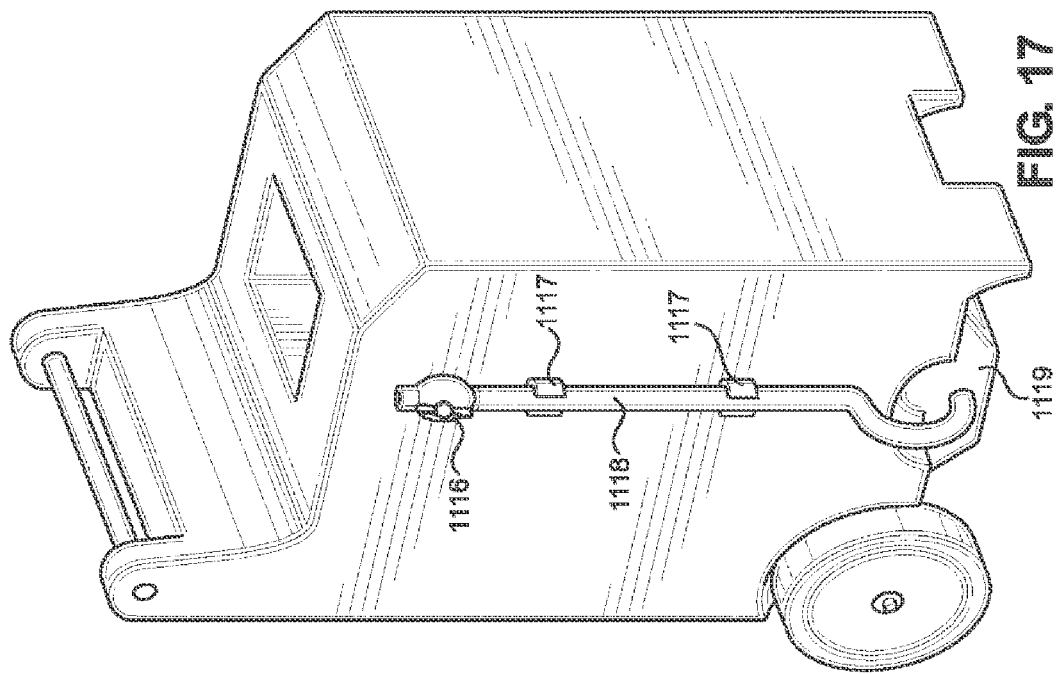
FIG. 17 illustrates a right-side perspective view of an alternative example embodiment of the self-contained and portable/mobile waste liquid collection and storage unit.
Figure 16:
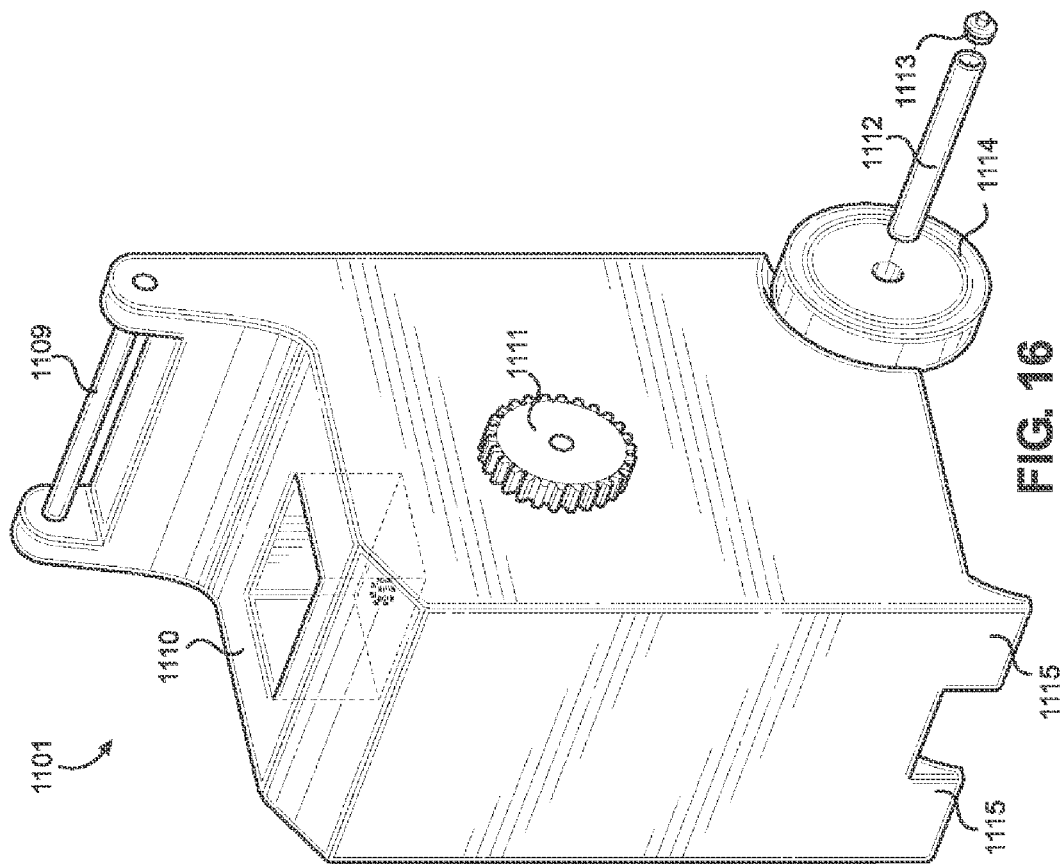
FIG. 16 illustrates a left-side perspective view of an alternative example embodiment of the self-contained and portable/mobile waste liquid collection and storage unit.
Figure 19:
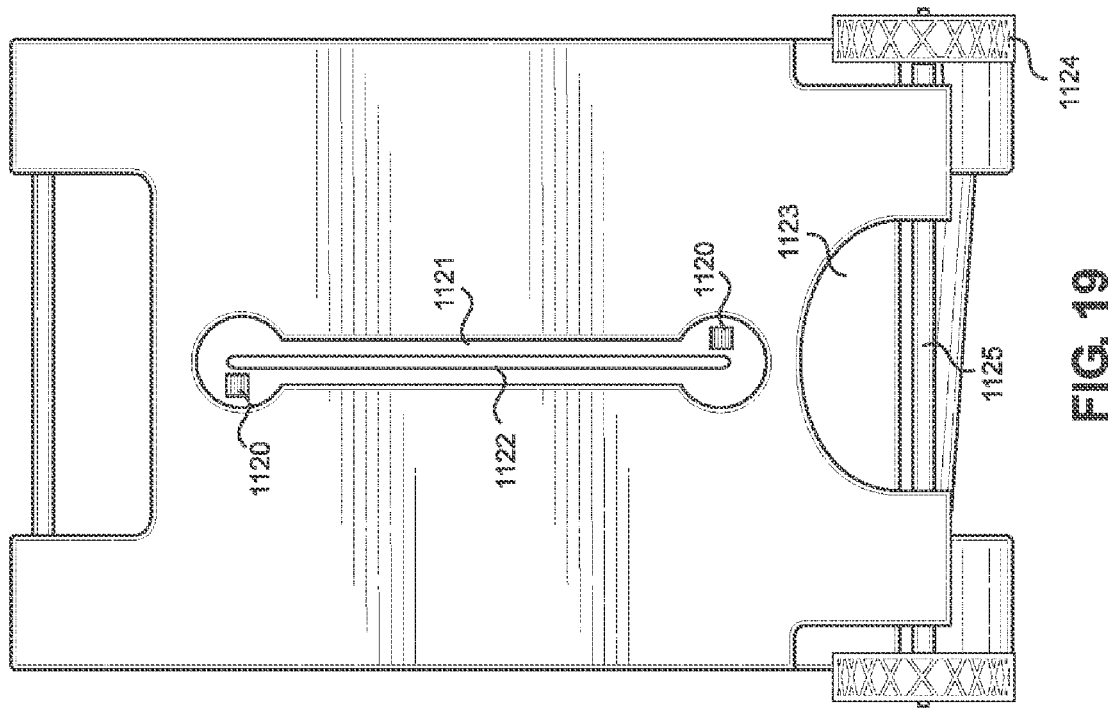
FIG. 19 illustrates a rear view of an alternative example embodiment of the self-contained and portable/mobile waste liquid collection and storage unit.
Figure 18:
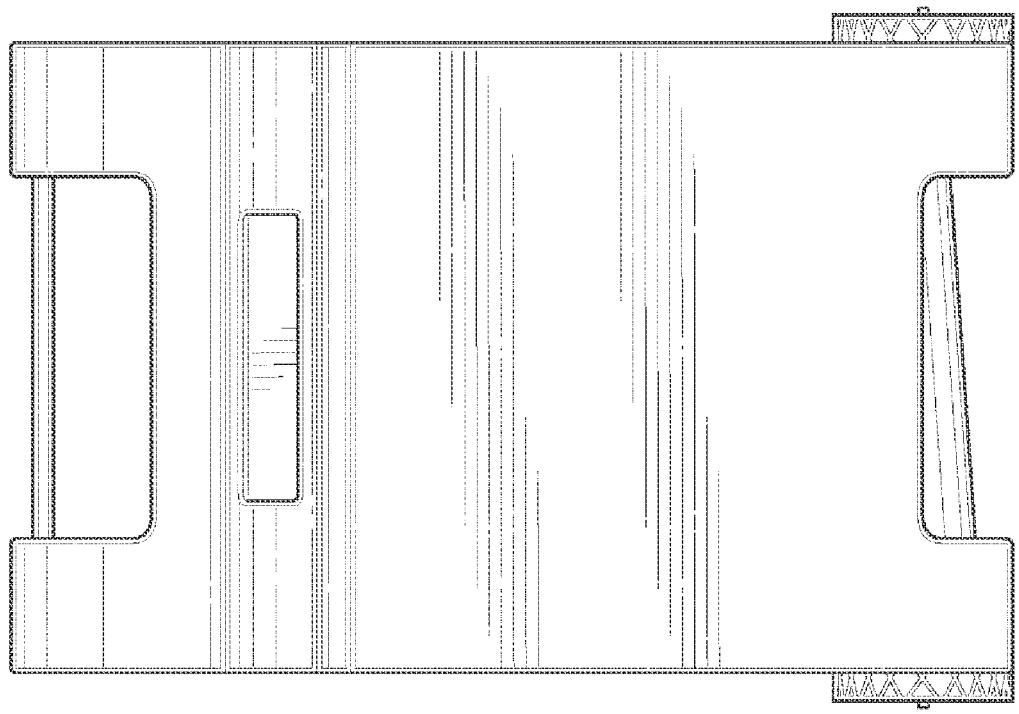
FIG. 18 illustrates a front view of an alternative example embodiment of the self-contained and portable/mobile waste liquid collection and storage unit.
Figure 21:
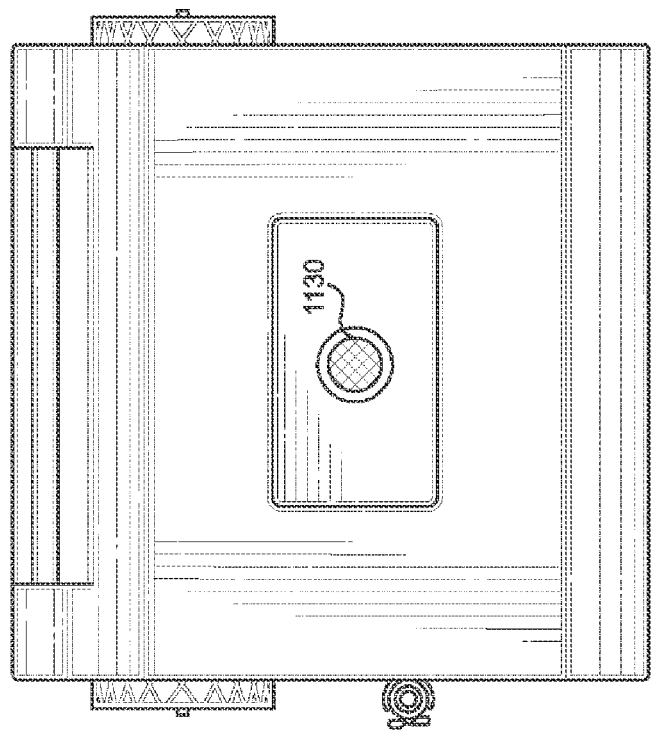
FIG. 21 illustrates a top view of an alternative example embodiment of the self-contained and portable/mobile waste liquid collection and storage unit.
Figure 20:
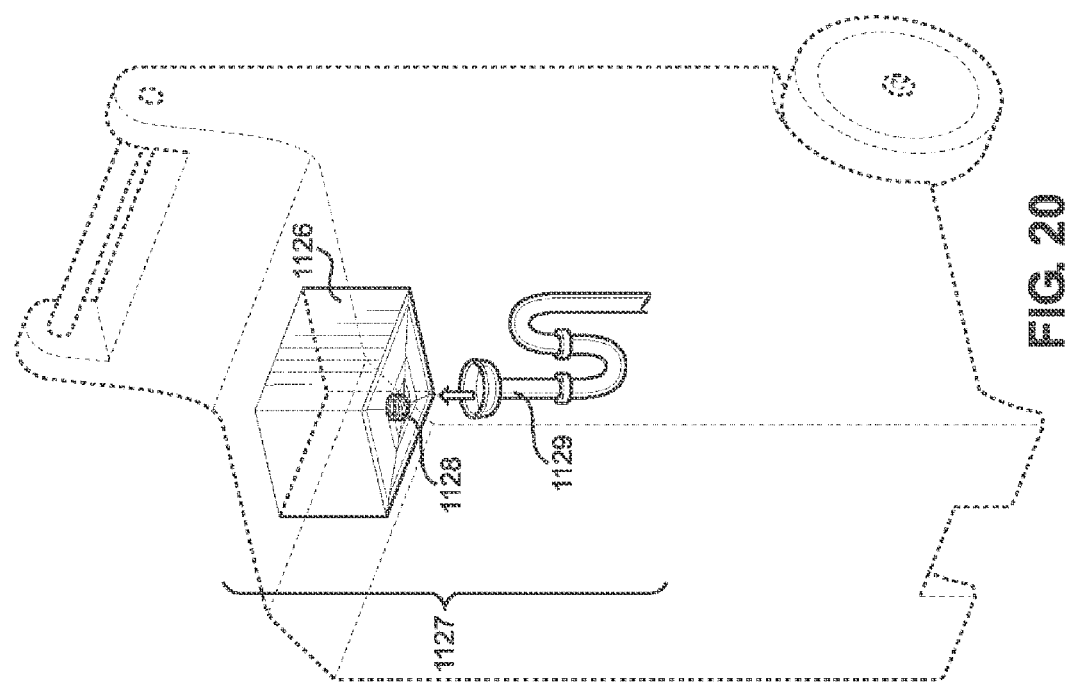
FIG. 20 illustrates a cutaway view of an alternative example embodiment of the self-contained and portable/mobile waste liquid collection and storage unit showing the sink, drain, and P-trap.

An Alternative Example Embodiment of a Self-Contained and Portable/Mobile Waste Liquid Collection and Storage Unit with an Integrated Sink Referring now to FIGS. 16 through 22, an alternative example embodiment of a self-contained and portable/mobile waste liquid collection and storage unit 1101 with an integrated sink 1110 is disclosed. As described in more detail below, FIG. 16 illustrates a left-side perspective view of an alternative example embodiment of the self-contained and portable/mobile waste liquid collection and storage unit. FIG. 17 illustrates a right-side perspective view of an alternative example embodiment of the self-contained and portable/mobile waste liquid collection and storage unit. FIG. 18 illustrates a front view of an alternative example embodiment of the self-contained and portable/mobile waste liquid collection and storage unit. FIG. 19 illustrates a rear view of an alternative example embodiment of the self-contained and portable/mobile waste liquid collection and storage unit. FIG. 20 illustrates a cutaway view of an alternative example embodiment of the self-contained and portable/mobile waste liquid collection and storage unit showing the sink, drain, and P-trap. FIG. 21 illustrates a top view of an alternative example embodiment of the self-contained and portable/mobile waste liquid collection and storage unit. FIG. 22 illustrates a bottom view of an alternative example embodiment of the self-contained and portable/mobile waste liquid collection and storage unit. Details of the illustrated alternative embodiment are provided below.

One purpose of the alternative example embodiment of the self-contained and portable/mobile waste liquid collection and storage unit with an integrated sink is to allow individuals from children to adults a place to pour unused liquid. The alternative example embodiment collects the unwanted liquid and stores the unwanted liquid in a liquid holding reservoir until the reservoir is full, allowing a person to wheel the portable/mobile trash receptacle to the appropriate recycling system for disposal.

In example embodiments, the alternative example embodiment of a self-contained and portable/mobile waste liquid collection and storage unit with an integrated sink is denoted herein as the PourAway™ Cadet™ (Cadet) or the unit. In the alternative example embodiment, the Cadet is a self-contained portable/mobile liquid recycling and storage receptacle. The Cadet is made by a rotational molding method using High-Density Polyethylene Plastic (HDPE). The design of the Cadet is unique and contains features specific to collection, storage, transport, and disposal of unwanted or waste liquids.

In example embodiments and with reference to FIGS. 16 through 22, the Cadet's collection method starts with a molded-in 10"×9"×7" deep sink 1110. The sink is connected to an internal P-Trap 1129. Having a P-Trap provides an airtight seal, which prevents smells and vapors from leaving the unit. On the side of the unit is a 4-inch watertight cap 1111 to allow servicing and cleaning of the inside of the tank and P-Trap. The void inside of the unit 1101 can serve as a waste liquid reservoir or holding tank.

In an example embodiment, the Cadet can store up to 15 gallons (weight equivalent of 125.5 lbs.). The unit is stable and sturdy and is designed to hold liquid and readily move large amounts of liquid, which can produce excessive weight. The Cadets HDPE wall thickness is ¼ inch. Mobility is provided using 8-inch steel hub rubber wheels 1114. The wheels are mounted on a ½ inch steel axle 1112 and held in place by stainless-steel axle end caps 1113. The bottom front of the Cadet is designed with two small feet or protrusions 1115 at the base and in front. These feet are specifically designed to hook on to the wall of a custodial drain and will allow the Cadet to be tilted forward for unmanned drainage. The unit is very ergonomic even when full. A foot peddle 1123 has been designed into the bottom of the unit for leverage to stabilize the unit prior to movement. The Cadet can easily be tilted back and maneuvered like roller luggage.

The clear volume level tube 1122 embedded just above the foot peddle in the back of the tank provides easy viewing of internal liquid levels and identifies when the tank is full.

The bottom/base of the Cadet is tapered to its lowest level for drainage collection. A ¾ inch fitting 1131 is spin welded into the area and a ¾ inch fitting 1131 is threaded in. The fitting 1131 connects to a ¾ flex drain hose 1133, which is held in the close upright position by (2) two stainless steel hose clamps 1117. Once the hose is removed from the side of the Cadet and laid to a drain, the ball valve 1116 at the top of the hose can be opened for flow to escape the storage area. Thus, an alternative example embodiment of a self-contained and portable/mobile waste liquid collection and storage unit with an integrated sink is shown and described.

REFERENCE NUMBERS USED IN FIGS. 16 THROUGH 22

- 1101—Self-contained and portable/mobile waste liquid collection and storage unit
- 1109—Molded Plastic handle
- 1110—Molded 9"×10"×7" deep sink
- 1111—4" service Cap
- 1112—½" Steel Axle
- 1113—Stainless Steel Permanent Wheel Fastener
- 1114—8"×1½" Steel Hub Rubber Wheel
- 1115—Molded Plastic Stabilizing Feet
- 1116—¾" Ball Valve
- 1117—Stainless Steel Hose Clamps
- 1118—¾" HDPE Flex Hose
- 1119—Tapered Drop Pan Design for Lowest Point Drain
- 1120—¼" Stainless Steel Elbow Threaded Fitting to Mount Volume Tube
- 1121—Recessed Channel to protect Volume Level Tube
- 1122—Plastic Volume Tube
- 1123—Molded Foot Peddle
- 1124—8"×1½" Steel Hub Rubber Wheel
- 1125—½" Steel Axle
- 1126—Cut Out View of Molded 9"×10"×7" Sink
- 1127—Complete Internal Drain System
- 1128—¾" Drain Fitting
- 1129—P-Trap
- 1130—Sink Drain
- 1131—¾" Spin Weld Fitting
- 1132—Bottom View of Tapered Drain Pan
- 1133—¾" HDPE Flex Drain Hose The various example embodiments disclosed herein solve the problem of liquids contaminating solids and recyclables in trash and thereby improve the related technology. The various example embodiments disclosed herein reduce costs for hauling unnecessary liquid weight, reduce $CO_2$ gas production from landfills, and reduce the number one cause of workers compensation claims in the U.S., which is back injuries. The disclosed example embodiments offer a user the ability to separate his or her liquids from solids when discarding waste by offering a sink area in the trash receptacle, which is used to catch liquid, direct it to a liquid tight reservoir tank, and retain the liquid to be discarded at a future time.

By reducing liquids in trash, the energy used to haul the trash is reduced. Liquid has a weight of 8.3 lbs. per gallon. Thus, reducing weight of the trash reduce the energy and costs related to hauling the trash. Additionally, the disclosed example embodiments reduce the volume of liquid in landfills. Both of these benefits produced by the disclosed example embodiments help to reduce $CO_2$ emissions and greenhouse gases. The disclosed example embodiments offer a way separate the weight of heaver liquids allowing the user the ability to pour liquids down the drain thereby providing organic liquid a free ride to the treatment plant rather than incurring the costly expense of transporting the liquid waste by truck to a landfill. Reducing weight and liquid from trash prevents the primary cause of worker's compensation and general liability claims in the U.S., which is back injuries and slip and fall incidents. No other mechanism offers a system by which a user can separate liquid from trash and store the liquid for later discard.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used only for descriptive purposes and not to be construed as limiting. The elements, materials, geometries, dimensions, and sequence of operations may all be varied for particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a self-contained and portable/mobile waste liquid collection and storage unit is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A self-contained and portable/mobile waste liquid collection and storage unit comprising:

a waste liquid reservoir within the unit, the reservoir being defined by a void within the unit and interior wall surfaces of the unit, the reservoir being tapered with a lowest point coupled to a fitting penetrating an exterior wall surface of the unit for drainage; and an integrated sink with a drain, the sink being molded into a top surface of the unit and fabricated using a same type of material as the top surface of the unit, the drain including a P-trap coupling to transfer waste liquid from the sink to the waste liquid reservoir.

2. The self-contained and portable/mobile waste liquid collection and storage unit of claim 1 wherein portions of the unit are fabricated from High-Density Polyethylene Plastic (HDPE).

3. The self-contained and portable/mobile waste liquid collection and storage unit of claim 1 including wheels mounted on a steel axle and held in place by axle end caps.

4. The self-contained and portable/mobile waste liquid collection and storage unit of claim 1 further including protrusions at a base and in front of the unit, the protrusions configured to hook on to a wall of a custodial drain and allow unmanned drainage of the unit.

5. The self-contained and portable/mobile waste liquid collection and storage unit of claim 1 further including a foot peddle at a base of the unit for leverage and stability prior to movement of the unit.

6. The self-contained and portable/mobile waste liquid collection and storage unit of claim 1 including a handle to tilt and roll the unit.

7. The self-contained and portable/mobile waste liquid collection and storage unit of claim 1 of further including a volume level tube showing a level of liquid inside the unit.

8. The self-contained and portable/mobile waste liquid collection and storage unit of claim 1 wherein the fitting is configured for attachment of a drain hose.

9. The self-contained and portable/mobile waste liquid collection and storage unit of claim 1 further including a drain hose coupled to the waste liquid reservoir.

10. The self-contained and portable/mobile waste liquid collection and storage unit of claim 1 further including a drain hose coupled to the waste liquid reservoir, the drain hose including a ball valve.

11. A method comprising:

fabricating a self-contained and portable/mobile waste liquid collection and storage unit with a waste liquid reservoir within the unit, the reservoir being defined by a void within the unit and interior wall surfaces of the unit, the reservoir being tapered with a lowest point coupled to a fitting penetrating an exterior wall surface of the unit for drainage; and fabricating an integrated sink with a drain within the unit, the sink being molded into a top surface of the unit and fabricated using a same type of material as the top surface of the unit, the drain including a P-trap coupling to transfer waste liquid from the sink to the waste liquid reservoir.

12. The method of claim 11 wherein portions of the unit are fabricated from High-Density Polyethylene Plastic (HDPE).

13. The method of claim 11 including mounting wheels on a steel axle held in place by axle end caps.

14. The method of claim 11 further including fabricating protrusions at a base and in front of the unit, the protrusions configured to hook on to a wall of a custodial drain and allow unmanned drainage of the unit.

15. The method of claim 11 further including fabricating a foot peddle at a base of the unit for leverage and stability prior to movement of the unit.

16. The method of claim 11 including fabricating a handle to tilt and roll the unit.

17. The method of claim 11 of further including fabricating a volume level tube showing a level of liquid inside the unit.

18. The method of claim 11 wherein the fitting is configured for attachment of a drain hose.

19. The method of claim 11 further including coupling a drain hose to the waste liquid reservoir.

20. The method of claim 11 further including coupling a drain hose to the waste liquid reservoir, the drain hose including a ball valve.

* * * * *